US010146612B1

(12) United States Patent
Buckner et al.

(10) Patent No.: US 10,146,612 B1
(45) Date of Patent: Dec. 4, 2018

(54) HISTORICAL DISK ERROR MONITORING

(71) Applicant: Sprint Communications Company L.P., Overland Park, KS (US)

(72) Inventors: Lowell Adrian Buckner, Tavares, FL (US); Bryson Earl, Altamonte Springs, FL (US); Christopher J. Maitland, Winter Park, FL (US); Jose Christopher Torres, Maitland, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 205 days.

(21) Appl. No.: 14/733,738

(22) Filed: Jun. 8, 2015

(51) Int. Cl.
*G06F 11/00* (2006.01)
*G06F 11/07* (2006.01)
*G11B 20/18* (2006.01)

(52) U.S. Cl.
CPC ........ *G06F 11/0793* (2013.01); *G06F 11/076* (2013.01); *G06F 11/0727* (2013.01); *G11B 20/18* (2013.01)

(58) Field of Classification Search
CPC . G06F 11/0793; G06F 11/0727; G06F 11/076
See application file for complete search history.

(56) References Cited

U.S. PATENT DOCUMENTS

| 8,316,263 | B1 | 11/2012 | Gough et al. | |
| 2003/0061546 | A1 | 3/2003 | Collins et al. | |
| 2004/0051988 | A1 | 3/2004 | Jing et al. | |
| 2004/0054849 | A1* | 3/2004 | Deenadhayalan | G06F 11/1076 711/112 |
| 2014/0344532 | A1* | 11/2014 | Lazier | G06F 3/0616 711/154 |
| 2015/0355962 | A1* | 12/2015 | Pathirane | G06F 11/0751 714/15 |
| 2016/0103630 | A1* | 4/2016 | Shen | G06F 3/0653 714/37 |
| 2016/0224412 | A1* | 8/2016 | Healy | G06F 11/1008 |
| 2016/0239663 | A1* | 8/2016 | Healy | G06F 21/554 |

* cited by examiner

*Primary Examiner* — Bryce P Bonzo
*Assistant Examiner* — Katherine Lin

(57) ABSTRACT

A server that monitors errors experienced by disk drives is disclosed. The server comprises an application stored in a memory; when executed by a processor sends a request to disk drives for a count of errors experienced by the disk drives. The application sends the request at a pre-defined time period. The application sends requests at multiple time periods. The application records the count of errors experienced by the disk drives, wherein the application records previous errors that have occurred on the disk drives over multiple time periods. The application determines an acceleration of errors experienced by the disk drives, wherein an acceleration of errors is a rate of change of the count of errors per the pre-defined time period. The application determines the acceleration of errors experienced by the disk drives. The application initiates corrective actions for at least one of the disk drives.

19 Claims, 6 Drawing Sheets

HISTORICAL DISK ERROR MONITORING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Disk drives may be used for storing and retrieving information. Data or information on a disk drive may be stored in a random access manner, where individual blocks of information or data may be stored or retrieved in any order, whether it be sequential or not. Disk drives may be comprised of several platters which are individual recording disks with magnetic heads that are arranged on a moving actuator arm to read and write data. Disk drives may further comprise a spindle, which is a spinning axle on which platters are mounted. Platters may rotate using one common technique: constant angular velocity (CAV). CAV may keep a disk spinning at a fixed rate that is measured in revolutions per minute (RPM). Disk drives that experience errors or stop functioning may cause a loss of information or functionality for a server that uses the disk drive.

SUMMARY

In an embodiment, a server that monitors errors experienced by disk drives is disclosed. The server comprises a processor, a memory, and an application stored in the memory. The application, when executed by the processor, sends a request to each of a plurality of disk drives for a count of errors that has been experienced by each of the plurality of disk drives, wherein the application sends the request at a pre-defined period of time, wherein the application sends requests at multiple pre-defined periods of time. The application records the count of errors experienced by each of the plurality of disk drives, wherein the application keeps a record of previous errors that have occurred on each of the plurality of disk drives over multiple pre-defined periods of time. The application determines an acceleration of errors experienced by each of the plurality of disk drives, wherein an acceleration of errors is a rate of change of the count of errors per the pre-defined time period. The application determines a type of error(s) experienced be each of the plurality of disk drives, wherein the types of errors comprise a transport error, a hard error, and a soft error. The application responsive to determining the acceleration of errors and the type of error(s) experienced, initiates corrective actions for at least one of the plurality of disk drives.

In an embodiment, a method of monitoring and initiating corrective actions for errors experienced by a plurality of disk drives. The method comprises a monitoring application executing on a computer system sending a request to each of a plurality of disk drives for a count of errors that has been experienced by each of the plurality of disk drives, wherein the monitoring application sends requests at a pre-defined period of time, wherein the monitoring application sends requests at multiple pre-defined periods of time. The method comprises the application recording the count of errors experienced by each of the plurality of disk drives by the monitoring application, wherein the monitoring application notes disk drives that have exceeded a pre-defined threshold for errors during the pre-defined period of time, wherein the monitoring application keeps a record of previous errors that have occurred on each of the plurality of disk drives. The method comprises the monitoring application determining an acceleration of errors experienced by each of the plurality of disk drives, wherein the acceleration of errors is a rate of change of the count of errors per the pre-defined time period. The method comprises the monitoring application determining a type of error(s) experienced by each of the plurality of disk drives, wherein the types of errors comprise a transport error, a hard error, and a soft error. The method comprises the monitoring application, responsive to determining the acceleration of errors and the type of error, initiating corrective actions for at least one of the plurality of disk drives.

In an embodiment, a method of monitoring and initiating corrective actions for a disk drive is disclosed. The method comprises a monitoring application stored in a processor memory of a disk drive and executing on a processor of the disk drive determining a count of errors that have been experienced by the disk drive over a pre-defined period of time, wherein the monitoring application stores the count of errors to the processor memory, wherein there are multiple recorded counts stored to the processor memory, wherein the monitoring application records the count of errors over multiple pre-defined periods of time. The method comprises the monitoring application determining an acceleration of errors experienced by the disk drive, wherein an acceleration of errors is a rate of change of the count of errors per the pre-defined time period. The method further comprises the monitor application, responsive to determining the acceleration of errors experienced by the disk drive, initiating corrective actions for the disk drive.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
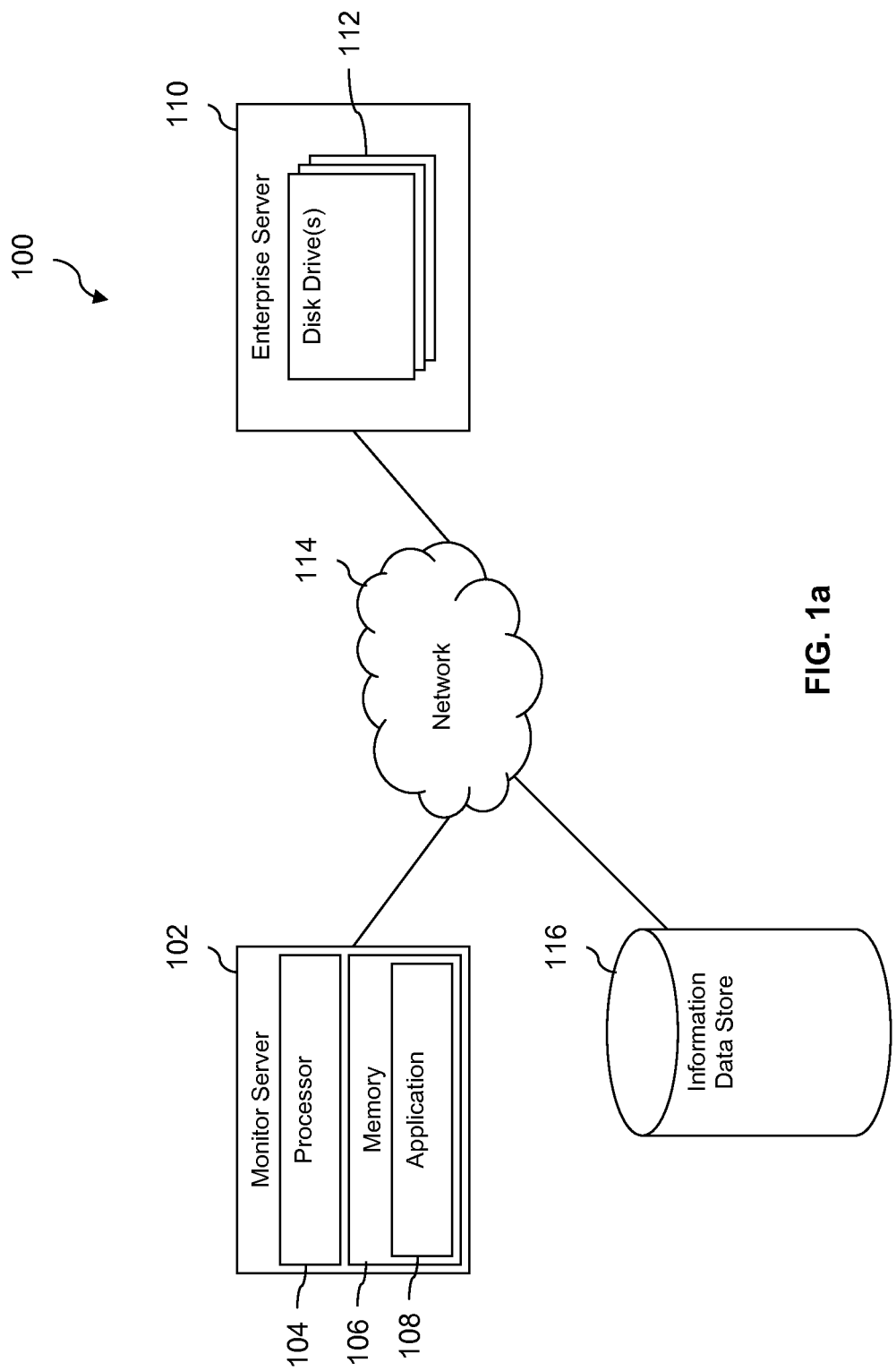
FIG. 1a is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and methods of proactively monitoring an acceleration of errors on a disk drive is disclosed. Prior to the implementation of a monitor application that periodically requests for and records a count of errors over several pre-defined periods of time, companies that wished to monitor an error count of disk drives may not have been able to proactively monitor, address, or replace disk drives that experience an acceleration of errors that were indicative of failing disk drives and lost information because they were unable to identify a failing disk drive before it failed.

The system described herein allows companies to monitor disk drive errors as they occur and determine if an acceleration of errors is being experienced by disk drives. A company or enterprise may operate a computing system that provides processing in support of company or enterprise activities. As an example, a computing system may perform one or more of determining bills of wireless communication subscribers, determine account balances of account holders, analyze large amounts of data about customers or potential customers in support of marketing and sales activities, track material inventory and product deliveries, manage employee records, track tax receipts and income tax filings, manage healthcare patient medical records, and the like. Typically, an enterprise computing system deploys a large number of disk drives to store data used by the processing. Failure of disk drives can result in diminished processing efficiency and/or loss of enterprise and/or customer data.

An acceleration or rate of change of disk drive errors is a rate of change of the count of errors per several pre-defined time periods. The system differentiates between the errors experienced by the disk drives and determines the type(s) of error experienced. The types of errors experienced by the disk drives may comprise transport errors, hard errors, and soft errors. A transport error is an error that indicates that the disk drive is experiencing a controller problem on the disk drive. A hard error is an error that is indicative of a hardware problem on the disk drive. A soft error is an error that is indicative of too many read or write requests to the disk drive that prevent the disk drive from functioning properly (e.g., the disk drive cannot satisfy all the requests before some of the requests time out).

Based on the particular type of error, companies may take different courses of action. For example, if a particular disk drive is experiencing hard errors at an accelerated rate that exceeds a pre-defined threshold for acceleration of errors over several pre-defined periods of time, the company may opt to immediately remove that disk drive if an adequate amount of disk drives remain functional. The company may also opt to replace the failing disk drive with a newer disk drive. The company may take this course of action because an acceleration of hard errors may be indicative of imminent failure of the disk drive. Other courses of action may not be as severe as removing the disk drive. For example, a disk drive may be experiencing an acceleration of soft errors where the disk drive is unable to satisfy all requests that it receives before some of the requests time out. In this event, a notification may be sent to an engineer that is associated with the disk drive, where the engineer may be able to reduce the number of requests sent to the disk drive.

Prior systems used to monitor disk errors were linear in their approach compared to the currently discussed system which is more comprehensive. Prior systems recorded a count of errors experienced by each of a plurality of disk drives over a pre-defined period of time, but might not have identified a failing disk drive before it failed. The currently discussed system records a count of errors over multiple pre-defined periods of time, keeps a history of errors experienced, determines a type of error experienced, compares the number of errors experienced during a current pre-defined period of time to a previous, similar pre-defined period of time, notes an acceleration of errors experienced during a more current pre-defined period of time, and initiates corrective actions based on the type of error and/or based on a back-up configuration associated with the subject disk drive. By doing this, it is possible to identify a failing disk drive before it fails.

Over time, the history of errors may be analyzed to develop statistics on disk errors to determine norms of disk errors at different points in the service life of disk drives. The analysis may be partitioned according to the type or model of disk drive (e.g., an analysis of errors conducted for a first plurality of disk drives of a first model would be conducted independently of an analysis of errors for a second plurality of disk drives of a second, different model). The analysis may further determine error rate and error acceleration statistics that may correlate with an impending disk drive failure. This kind of analysis may be used to reach an agreement with disk vendors to permit the operator to request warranty fulfillment on a disk drive that has not yet failed on the basis of the prediction of impending failure.

In an embodiment, a monitor server that comprises a monitor application sends a request to each of a plurality of disk drives for a count of errors that has been experienced by each of the plurality of disk drives. The application periodically sends the request every pre-defined period of time, and further sends requests at multiple pre-defined periods. These pre-defined periods of time may be every minute, every five minutes, every ten minutes, every fifteen minutes, every thirty minutes, every hour, or some other pre-defined period of time. The application records the count of errors experienced by each of the plurality of disk drives. The application determines disk drives that have exceeded a pre-defined threshold for errors during the pre-defined period of time. The application also keeps a record of previous errors that have occurred on each of the plurality of disk drives over multiple pre-defined periods of time. The record of previous errors comprises the number of errors experienced by a disk drive, the times that the errors were experienced, and the type of errors experienced by a disk drive The application determines an acceleration or rate of change of errors experienced by each of the plurality of disk drives. The acceleration of errors is a rate of change of the count of errors per the pre-defined time period. The application determines a type of error(s) experienced by each of the plurality of disk drives. The types of errors experienced by the disk drives may comprise transport errors, hard errors, and soft errors. A transport error is an error that indicates that the disk drive is experiencing a controller problem on the disk drive. A hard error is an error that is indicative of a hardware problem on the disk drive. A soft error is an error that is indicative of too many read or write requests to the disk drive that prevent the disk drive from functioning properly (e.g., the disk drive cannot satisfy all the requests before some of the requests time out). The application may initiate corrective actions for at least one of the plurality of disk drives. For example, the application may send an alert to an engineer that is able to address the error, accordingly.

In an embodiment, a disk drive may experience a count of hard errors that exceed the threshold for acceleration during the pre-defined periods of time. This may be indicative of a failing disk drive. When the monitoring application determines a failing disk drive, the monitoring application may send out a notification to an engineer to remove and/or replace the failing disk drive based on the amount of disk drives that remain and whether they are able to handle the processes of the failing disk drive. In an embodiment, a disk drive may experience a count of soft errors that exceed the threshold for acceleration of errors during the pre-defined periods of time. This may be indicative of a failing drive, but may also be indicative of an inundation of requests made to the disk drive to the point where the disk drive is not able to handle all the requests before some requests time out. Based on this situation, the monitoring application sends a notification to an engineer that is associated with the disk drive to determine if removal and replacement of the disk drive would be useful or if a lessening of tasks would help the disk drive perform at an optimal level without experiencing errors at an accelerated rate.

The thresholds described herein may be determined in any way desired. The thresholds may be determined as an estimate or guess by programmers or system administrators. Over time, the suitability of these thresholds determined by estimates or guesses may be evaluated and the values of the thresholds adapted to make them more suitable. Alternatively, disk error and disk failure histories may be available—either from within an organization or enterprise using the disks or from a vendor of the disks—and these histories may be analyzed to determine suitable thresholds.

With a monitor application that monitors and proactively initiates corrective actions for failing disk drives, companies can detect when a disk drive is failing by detecting an acceleration of errors, building a record of errors experienced, and salvaging information before a failing disk drive becomes a failed disk drive. The monitor application promotes security of information and functionality of servers by noting when a disk drive is failing and allows companies to replace failing disk drives to salvage information before disk drives fail.

Turning now to FIG. 1a, a system 100 is described. In an embodiment, the system 100 comprises a monitor server 102. The monitor server 102 comprises a processor 104 and a memory 106 that stores a monitor application 108. The system 100 further comprises an enterprise server 110 that comprises a plurality of disk drives 112. The system 100 further comprises a network 114 and an information data store 116. The monitor server 102 via the monitor application 108 monitors the plurality of disk drives 112 by periodically sending a request for a count of errors experienced by each of the plurality of disk drives 112. The application 108 may send requests at multiple pre-defined periods of time.

In addition to evaluating the count of errors experienced during a pre-defined period of time, the application 108 also evaluates and determines whether the count of errors for each of the plurality of disk drives 112 or has not exceeded a pre-defined threshold of errors per the pre-defined period of time. In addition to monitoring the plurality of disk drives 112 and evaluating that the count of errors has not exceeded a pre-defined threshold over the predefined period of time, the application 108 determines an acceleration or rate of change of errors experienced per time interval by each of the plurality of disk drives 112. An acceleration of errors is a rate of change of the count of errors per the pre-defined time period. The application 108 may determine an acceleration of errors by comparing the results of a current count to a previous count that was recorded after a similar pre-defined period of time. It is understood that a count of errors per unit of time is inherently a rate of errors.

By searching for an acceleration of errors experienced by each of the plurality of disk drives 112, the application 108 may be able to predict that at least one of the plurality of disk drives 112 is failing, determine the kind of errors that the at least one failing disk drive 112 is experiencing, and initiate corrective actions based on the type of error to prevent a loss of information or function of the enterprise server 110. By evaluating the combination of relating error counts to thresholds and evaluating the acceleration of errors, the application 108 may be able to more accurately predict when a disk drive 112 failure will occur and predict more in advance a disk drive 112 failure.

In an embodiment, the pre-defined periods of time that the application 108 sends a request to each of the plurality of disk drives 112 may be every minute, every five minutes, every ten minutes, every fifteen minutes, every thirty minutes, every hour, or some other pre-defined period of time. The pre-defined threshold for errors experienced may be one error for every five minutes, two errors for every ten minutes, three errors for every fifteen minutes, six errors for every thirty minutes, twelve errors for every hour, or another count of errors that may be a pre-defined threshold for errors experienced over another pre-defined period of time.

The application 108 also determines the type of errors experienced by each of the plurality of disk drives 112. The types of errors may comprise transport errors, hard errors, and soft errors. Transport errors may be errors that are related to controller errors. Hard errors may be related to hardware errors that may comprise a malfunctioning platter (s) or spindle(s) of the at least one disk drive 112. Soft errors may be related to issues such as the disk drive attempting to perform too many functions and losing functionality due to the oversaturation of functions. In an embodiment, there may be independent pre-defined thresholds for each error type, where transport errors and hard errors may be addressed more rapidly than soft errors. Each type of error may have its own pre-defined threshold for errors. Determining the type of error assists the application 108 in initiating the proper corrective action based on the type of error experienced.

The enterprise server 110 is in communication with the monitor server 102 and allows the monitor application 108 to perform the function of monitoring the plurality of disk drives 112 that are executing as a part of the enterprise server 110. The enterprise server 110 may be a server that executes a database management application and provides access to the disk drives 112. The plurality of disk drives 112 may execute as a part of the enterprise server 110 (e.g., be read from and written to under mediation by an application executing on the enterprise server 110) and may store and transport information that is germane to the enterprise server 110 or to other computing assets that access the disk drives 112 via the mediation of the enterprise server 110. While in FIG. 1a, the disk drives 112 are illustrated as inside the enterprise server 110, the disk drives 112 may be external to the enterprise server 110 and may be communicatively coupled to the enterprise server 110. In another embodiment, the disk drives 112 may be external to the enterprise server 110 and may be directly accessed from a communication network by a plurality of computers or enterprise servers 110 without mediation of an intermediate server.

The information data store 116 may be associated with the monitor server 102 and may store information that the monitor application 108 retrieves from the plurality of disk drives 112 regarding the count of errors experienced during multiple pre-defined periods of time. The information data store 116 may be said to store an error history of the disk drives 112. The monitor server 102, the enterprise server 110, and the information data store 116 may be communicatively coupled to the network 114. The network 114 may be a private communication network, a public communication network, or a combination thereof. While one monitor server 102, one enterprise server 110, and one information data store 116 are illustrated in FIG. 1a, it should be understood that the system 100 may comprise any number of monitor servers 102, enterprise servers 110, and information data stores 116. While three disk drives 112 are illustrated in FIG. 1a, it should be understood that the system 100 may comprise any number of disk drives 112 in the plurality of disk drives 112.

In an embodiment, the monitor application 108 is executed by the processor 104. The application 108 sends a request to each of the plurality of disk drives 112 for a count of errors that has been experienced by each of the plurality of disk drives 112. The application 108 sends the request at a pre-defined period of time, wherein the application 108 sends requests at multiple pre-defined periods of time. The pre-defined periods of time that the application 108 sends requests may be every minute, every five minutes, every ten minutes, every fifteen minutes, every thirty minutes, every hour, or some other pre-defined period of time.

The application 108 records the count of errors experienced by each of the plurality of disk drives 112. The application 108 may determine disk drives 112 that have experienced a number of errors that exceeded a pre-defined threshold for errors during the pre-defined period of time. The pre-defined threshold for errors experienced by disk drive 112 may be one error for every one minute, one error for every five minutes, two errors for every ten minutes, three errors for every fifteen minutes, six errors for every thirty minutes, twelve, errors for every hour, or another count of errors that may be a pre-defined threshold for errors experienced over another pre-defined period of time. The application 108 keeps a record of previous errors that have occurred on each of the plurality of disk drives 112 over multiple pre-defined periods of time. The record that the application 108 keeps may comprise information regarding the number of errors experienced, the times that the errors were experienced, and the type of errors experienced. The application 108 stores the record to the information data store 116 and refers to the information data store 116 when it is necessary to compare a recent count of errors to a previous count of errors over a pre-defined period of time. In an embodiment, the information data store 116 may keep a record of counts for up to an hour past the count, a day past the count, a week past the count, a month past the count, or some other pre-defined period of time past the count. In an embodiment, the application 108 may store the records to the information data store 116, the memory 106 on the monitor server 102, and/or an internal memory on the application 108.

The application 108 evaluates the count of errors experienced by a disk drive 112, compares the counts of errors to previous counts of errors by referring to the information data store 116, and determines if a disk drive 112 is experiencing an acceleration or rate of change of errors. The acceleration of errors is a rate of change of the count of errors per a pre-defined period of time. By way of example, in a first previous count at least one of the disk drives 112 experienced two errors during a thirty minute time period which is a count of errors that does not exceed the pre-defined threshold of six errors for thirty minutes. During a second, but more recent previous count, the same disk drive may have experienced four errors, which still does not exceed the pre-defined threshold for errors in a thirty minute time period, but the application 108 may record this increase in the count of errors experienced by the at least one disk drive 112. During a third and most recent count, the same disk drive 112 may have experienced five errors, which still does not exceed the threshold for errors during a thirty minute period, but because of the consecutive increases or acceleration in errors and with the errors approaching close to the threshold, the application 108 sends an alert to an engineer that will be able to evaluate the situation and address the issue, accordingly. If the count of errors exceeds the pre-defined threshold for errors during a pre-defined time period, the alert may be sent automatically.

The application 108 determines a type(s) of errors experienced by each of the plurality of disk drives 112. The types of errors may comprise a transport error, a hard error, or a soft error. A transport error may be an error related to a controller problem of a disk drive 112. A hard error may be an error related to a hardware problem that may be a faulty platter or spool of the disk drive 112. A soft error may be an error related to an oversaturation of tasks for the disk drive 112 which may cause the at least one disk drive 112 to function improperly. Responsive to determining the type of error(s) experienced by the disk drive 112, the application 108 initiates corrective actions for the at least one of the plurality of disk drives 112. The application 108 may send an alert to an engineer that may address the issue experienced by the disk drive 112, accordingly. The application 108 may take the disk drive 112 offline before the disk drive 112 stops functioning entirely, and allow an engineer to salvage and transfer information on the at least one disk drive 112 to another disk drive 112. In an embodiment, the acceleration of error information may be used to obtain warranty service from a vendor of the disk drive 112 without the disk drive 112 actually failing. Because, the application 108 may predict when a disk drive 112 is going to fail, this may allow the company that is using the disk drive to invoke the services of the vendor. The application 108 may append this vendor information to the alert that it sends to an engineer that evaluates the alert.

Figure 1B:
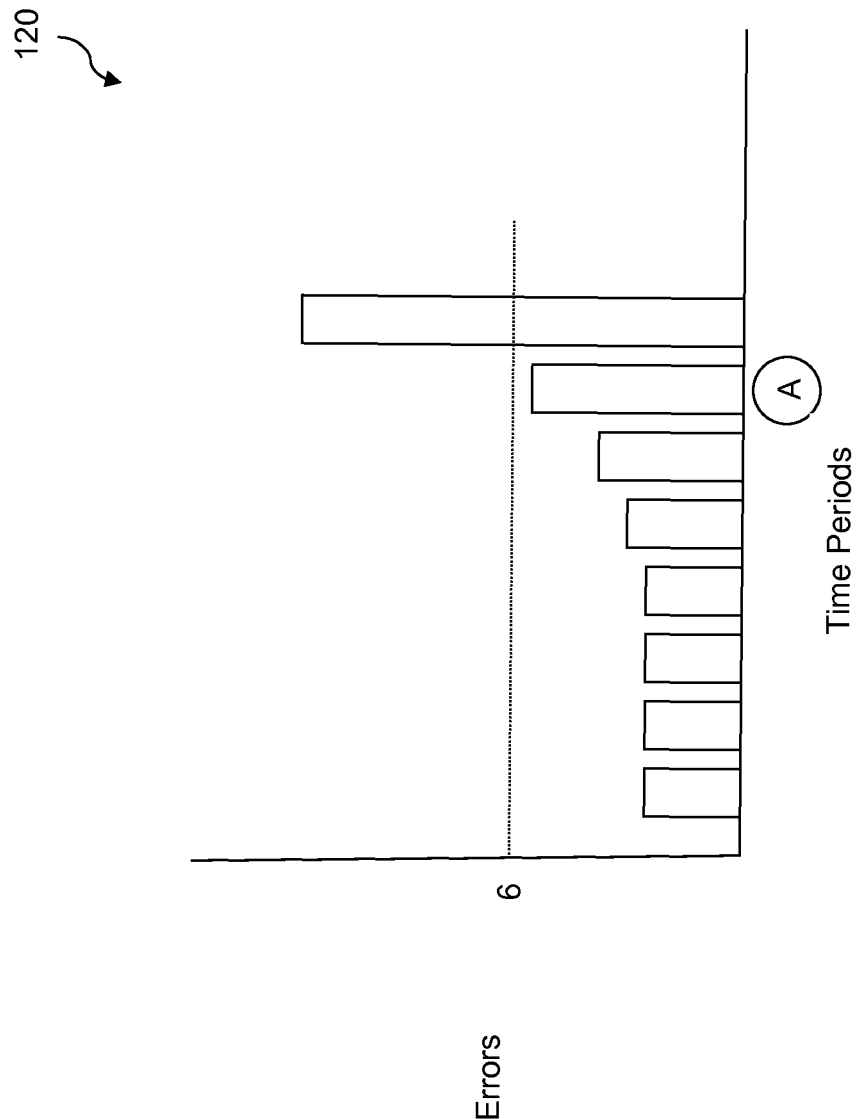
FIG. 1b is a graph illustrative of the results of a system according to an embodiment of the disclosure.

In FIG. 1b, a bar graph 120 illustrates an acceleration of errors recorded by the monitor application 108 from the system 100 illustrated in FIG. 1a. In the graph 120, there are eight bars; each bar may represent a recorded number of errors on a disk drive 112 during a pre-defined time period, e.g., errors experienced in a pre-defined time period of fifteen minutes. Starting on the left side of the graph, the first four bars may represent four separate, consecutive fifteen minute time periods. The number of errors experienced by disk drive 112 during the first four time periods may be two errors for each fifteen minute time period. This number of errors does not trigger an alert or alarm for the monitor application 108. At the fifth bar, the number of errors experienced by the disk drive 112 has increased to three errors. Again, three errors does not trigger any alarm for the monitor application 108. At the sixth bar, the number of errors experienced by the at least one disk drive 112 has increased to four errors. The application 108 records this, but does not trigger an alert or alarm. The application 108 may separate the recording of the errors experienced by the disk drive 112 to a separate recorded list. At the seventh bar, the number of errors experienced by the disk drive 112 has increased to five errors. Because there have been several consecutive periods of time where the number of errors has increased, the application 108 triggers and sends an alert to an engineer that is able to address the possibly failing disk drive, accordingly. The alert (shown on FIG. 1b by the letter "A" with a circle around) it indicates that the alert was sent. The eighth bar represents a possible outcome if the possibly failing disk drive 112 is not addressed in that the amount of errors has increased to ten errors, which may cause the disk drive 112 to shut down.

Figure 1C:
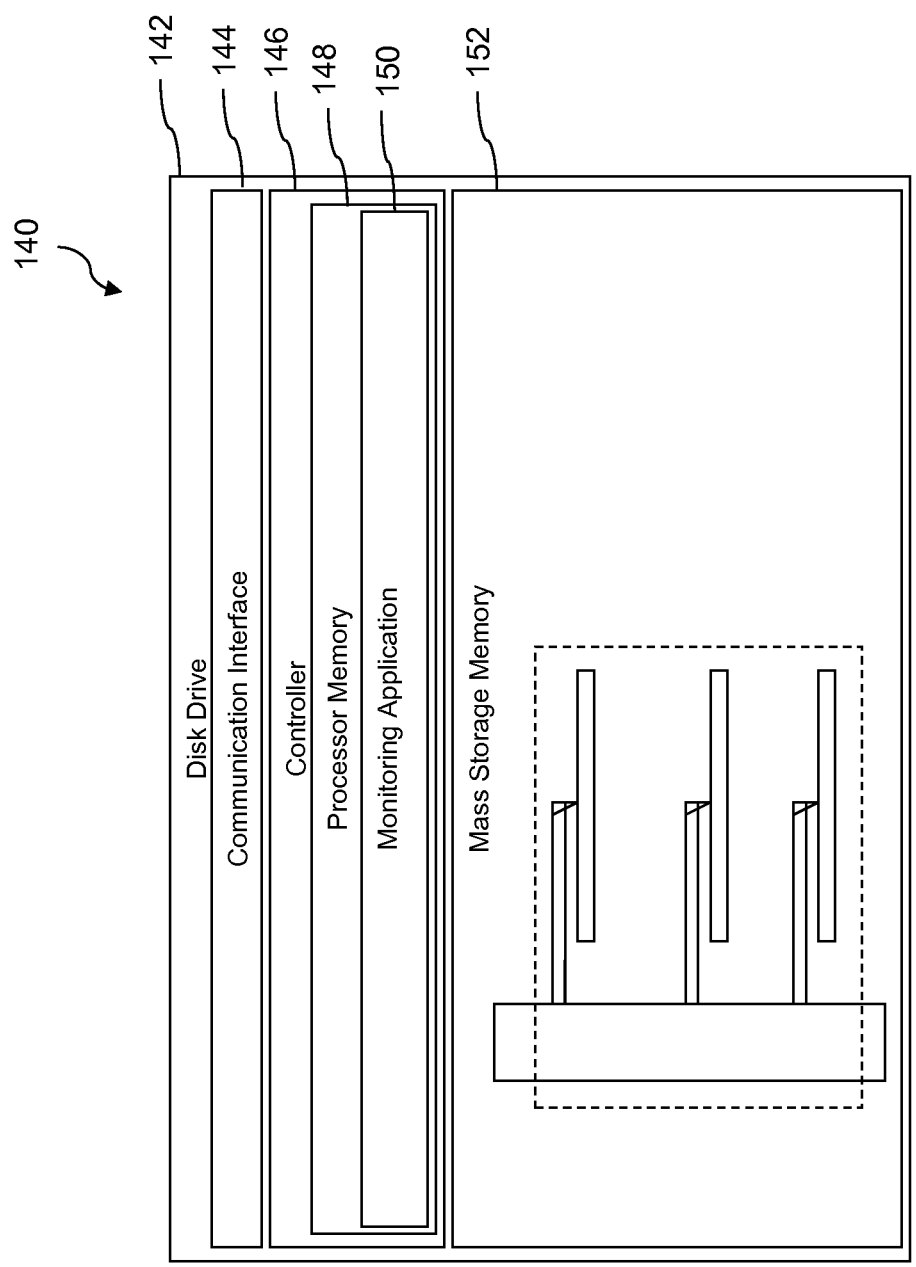
FIG. 1c is a block diagram of a system according to an embodiment of the disclosure.

In FIG. 1c, a system 140 is described. The system 140 comprises a disk drive 142, a communication interface 144, a controller 146 that comprises a processor memory 148 that comprises a monitoring application 150. The disk drive 142 further comprises a mass storage memory 152. The disk drive 142 performs read or write functionality and may be a part of a plurality of disk drives functioning on a server computer. The communication interface 144 is the connection by which the disk drive 142 is connected to the server computer. The controller 146 enables the disk drive 142 to communicate with the server computer that it executes on. The controller 146 also executes the monitoring application 150. The processor memory 148 stores the monitoring application 150. In an embodiment, the mass storage memory 152 may comprise a spindle, a plurality of actuator arms, a plurality of read-write heads coupled to the actuator arms, and a plurality of platters. Platters may be individual recording disks with magnetic coated surfaces susceptible of storing data as localized magnetic fields that are written to them by the read-write heads that are arranged on a moving actuator arms. The spindle is a spinning axle on which the platters are mounted. It will be appreciated that different implementations of the disk drive 142 may advantageously apply the teachings of the present disclosure. In an embodiment, the disk drive 142 may feature optical disks rather than disks with magnetically coated surfaces. The monitoring application 150 when executed by the controller 146 tracks errors of the disk drive 142. The monitoring application 150 tracks hard errors, soft errors, and controller errors. The monitoring application 150 performs the calculations described above for determining an acceleration or errors and sending out notifications to engineers when one or more preset thresholds of errors have been exceeded, for example a threshold of errors per unit of time and/or a threshold of error acceleration.

Figure 2:
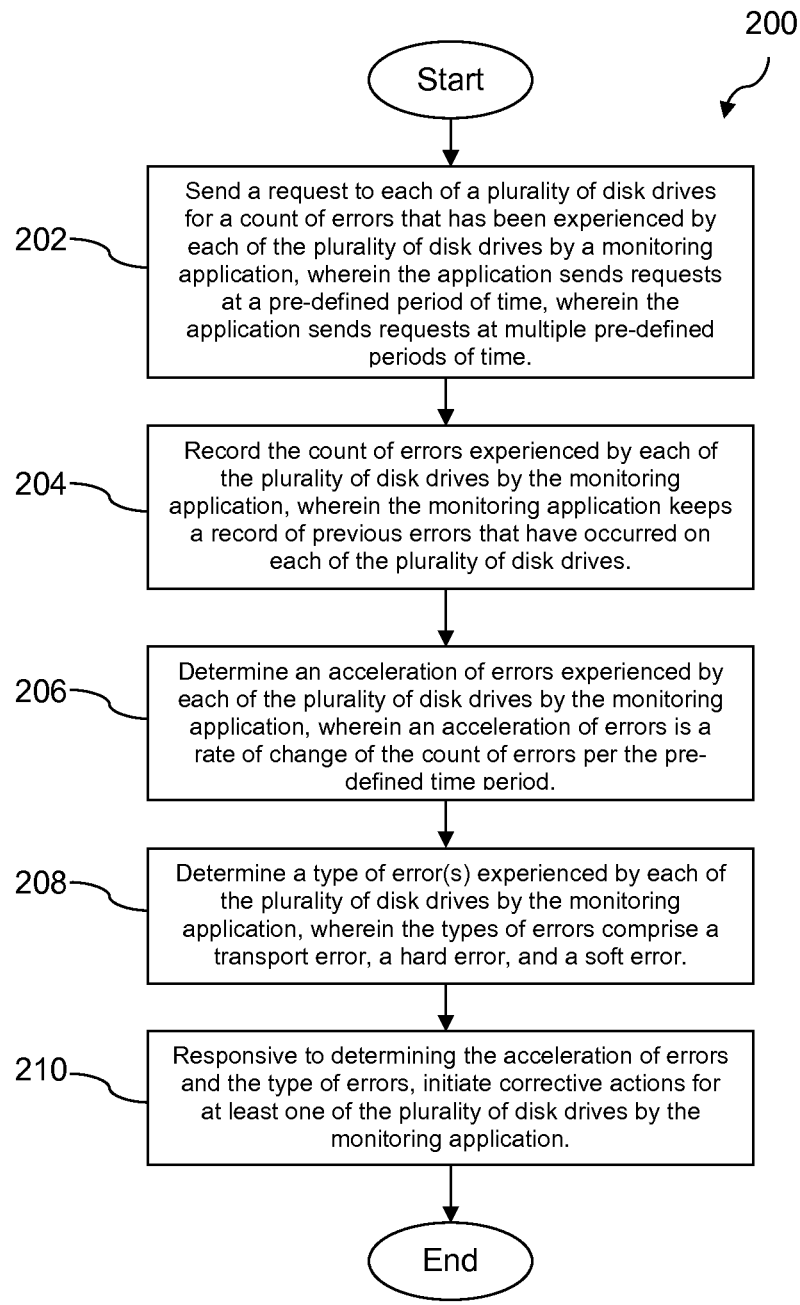
FIG. 2 is a flow chart of a method according to an embodiment of the disclosure.

In FIG. 2, a method 200 is described. At block 202, a monitoring application sends a request to each of a plurality of disk drives for a count of errors that has been experienced by each of the plurality of disk drives, wherein the monitoring application sends requests at a pre-defined period of time, wherein the monitoring application sends requests at multiple pre-defined periods of time. At block 204, the monitoring application records the count of errors experienced by each of the plurality of disk drives, wherein the monitoring application notes disk drives that have exceeded a pre-defined threshold for errors during the pre-defined period of time, wherein the monitoring application keeps a record of previous errors that have occurred on each of the plurality of disk drives. At block 206, the monitoring application determines an acceleration of errors experienced by each of the plurality of disk drives, wherein an acceleration of errors is a rate of change of the count of errors per the pre-defined time period. At block 208, the monitoring application determines a type of error(s) experienced by each of the plurality of disk drives, wherein the types of errors comprise a transport error, a hard error, and a soft error. At block 210, the monitoring application, responsive to determining the acceleration of errors and the type of error, initiates corrective actions for at least one of the plurality of disk drives.

Figure 3:
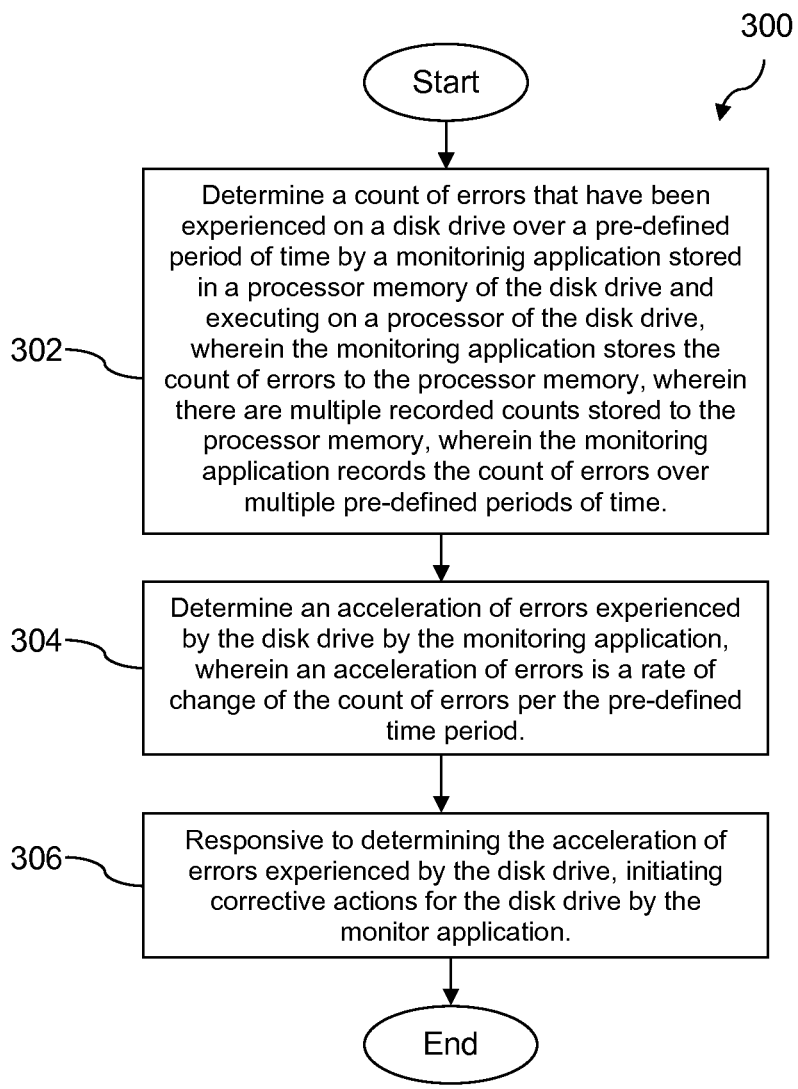
FIG. 3 is a flow chart of a method according to an embodiment of the disclosure.

In FIG. 3, a method 300 is described. At block 302, a monitoring application stored in a processor memory of a disk drive and executing on a processor of the disk drive determines a count of errors that has been experienced on the disk drive over a pre-defined period of time, wherein the monitoring application stores the count of errors to the processor memory, wherein there are multiple recorded counts stored to the processor memory, wherein the monitoring application records the count of errors over multiple pre-defined periods of time. At block 304, the monitor application determines an acceleration of errors experienced by the disk drive, wherein an acceleration of errors is a rate of change of the count of errors per the pre-defined time period. At block 306, the monitoring application determines whether the error is a transport error, a hard error, or a soft error. At block 308, the monitoring application, responsive to determining the type of acceleration of errors experienced by the disk drive initiates corrective actions for the disk drive.

Figure 4:
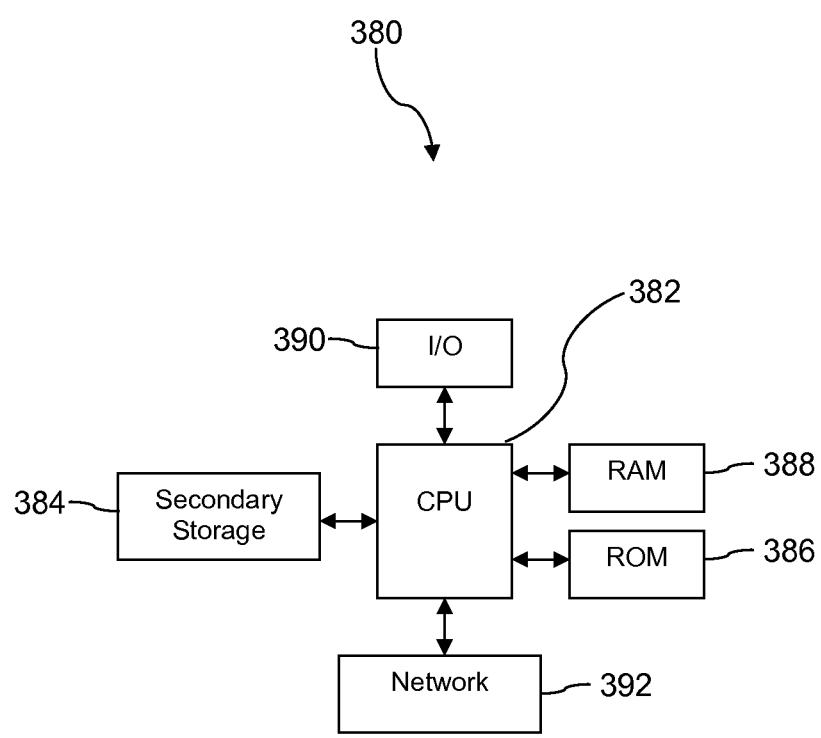
FIG. 4 illustrates an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A server that monitors errors experienced by disk drives, comprising:
a processor,
a non-transitory memory,
an application stored in the non-transitory memory, that when executed by the processor,
sends a plurality of requests at multiple pre-defined periods of time to each disk drive of a plurality of disk drives for a count of errors that has been experienced by each disk drive, wherein the application sends each request of the plurality of requests at a pre-defined period of time,
records the count of errors experienced by each disk drive to generate a record of previous errors that have occurred on each disk drive over the multiple pre-defined periods of time,
determines, based on the record of previous errors, an acceleration of errors experienced by each disk drive, wherein the acceleration of errors comprises a rate of change of the count of errors per the pre-defined period of time for each disk drive,
determines, based on the record of previous errors, a type of error of a plurality of types of errors experienced by each disk drive, wherein the plurality of types of errors comprises a transport error, a hard error, and a soft error, and wherein the hard error comprises a malfunctioning of a hardware component of a disk drive,
compares the count of errors experienced by each disk drive during the pre-defined period of time to a corresponding pre-defined error threshold of a plurality of pre-defined error thresholds, wherein the corresponding pre-defined error threshold depends on the type of error experienced by the disk drive, and
responsive to determining the acceleration of errors and the type of error experienced by at least one disk drive of the plurality of disk drives and comparing the count of errors experienced by the at least one disk drive to the corresponding pre-defined error threshold, initiates at least one corrective action for the at least one disk drive, wherein the at least one corrective action is different depending on which type of error of the plurality of types of errors is experienced by the at least one disk drive.

2. The server of claim 1, wherein the pre-defined period of time is one of every one minute, every five minutes, every ten minutes, every fifteen minutes, every thirty minutes, and every hour.

3. The server of claim 1, wherein the corresponding pre-defined error threshold is one of: one error for one minute, one error for every five minutes, two errors for every ten minutes, three errors for every fifteen minutes, six errors for every thirty minutes, or twelve errors for every hour.

4. The server of claim 1, wherein the transport error is associated with controller problems of the disk drive.

5. The server of claim 1, wherein the soft error is associated with excess read or write cycles.

6. The server of claim 1, wherein the plurality of disk drives are coupled to an enterprise server and store information that is germane to the enterprise server.

7. A method of monitoring and initiating corrective actions for errors experienced by a plurality of disk drives, each step of the method performed by a monitoring application executing on a computer system, the method comprising:
sending a plurality of requests at multiple pre-defined periods of time to each disk drive of a plurality of disk drives for a count of errors that has been experienced by each disk drive, wherein the application sends each request of the plurality of requests at a pre-defined period of time;

recording the count of errors experienced by each disk drive, wherein the monitoring application keeps a record of previous errors that have occurred on each of the disk drives;

determining, based on the record of previous errors, a type of error of a plurality of types of errors experienced by each disk drive, wherein the plurality of types of errors comprises a transport error, a hard error, and a soft error, and wherein the hard error comprises a malfunctioning of a hardware component of a disk drive;

comparing the count of errors experienced by each disk drive during the pre-defined period of time to a corresponding pre-defined error threshold of a plurality of pre-defined error thresholds, wherein the corresponding pre-defined error threshold depends on the type of error experienced by the disk drive;

determining that one or more disk drives are associated with an error count that exceeds the corresponding pre-defined error threshold during the pre-defined period of time;

determining an acceleration of errors experienced by each disk drive, wherein the acceleration of errors comprises a rate of change of the count of errors per the pre-defined period of time; and responsive to determining the acceleration of errors and the type of error experienced by at least one disk drive and comparing the count of errors experienced by the at least one disk drive to the corresponding threshold, initiating a corrective action for the at least one disk drive, wherein the at least one corrective action is different depending on which type of error of the plurality of types of errors is experienced by the at least one disk drive.

8. The method of claim 7, further comprising storing, by the monitoring application, the count of errors experienced by each disk drive in an information data store.

9. The method of claim 8, wherein the information data store keeps recorded counts one of an hour past the count, a day past the count, a week past the count, and a month past the count.

10. The method of claim 7, further comprising storing the count of errors experienced by each disk drive in an internal memory of the monitor application.

11. The method of claim 7, further comprising sending an alert in response to the determination that the count of errors of the one or more disk drives has exceeded the corresponding pre-defined error threshold.

12. The method of claim 7, further comprising sending an alert in response to a determination that the count of errors for a disk drive has increased or accelerated after two consecutive pre-defined time periods even when the count of errors experienced by the disk drive during the two consecutive pre-defined time periods does not exceed the corresponding predefined error threshold.

13. The method of claim 12, wherein the monitoring application sends the alert to an engineer.

14. A method of monitoring and initiating corrective actions for a disk drive, each step of the method performed by a monitoring application stored in a non-transitory memory of a disk drive and executed on a processor of the disk drive, the method comprising:

determining a count of errors that has been experienced on the disk drive over a pre-defined period of time, wherein the monitoring application stores the count of errors to the processor memory, wherein there are multiple recorded counts stored to the processor memory, and wherein the monitoring application records the count of errors over multiple pre-defined periods of time;

determining an acceleration of errors experienced by the disk drive, wherein the acceleration of errors comprises a rate of change of the count of errors per the pre-defined period of time;

determines, based on the stored count of errors, a type of error of a plurality of types of errors experienced by the disk drive, wherein the plurality of types of errors comprises a transport error, a hard error, and a soft error, and wherein the hard error comprises a malfunctioning of a hardware component of the disk drive;

comparing the count of errors experienced by the disk drive during the pre-defined period of time to a corresponding pre-defined error threshold of a plurality of pre-defined error thresholds, wherein the corresponding pre-defined error threshold depends on the type of error experienced by the disk drive; and responsive to determining the acceleration of errors and the type of error experienced by the disk drive and comparing the count of errors experienced by the at least one disk drive to the corresponding pre-defined error threshold, initiating at least one corrective action for the disk drive, wherein the at least one corrective action is different depending on which type of error of the plurality of types of errors is experienced by the at least one disk drive.

15. The method of claim 14, wherein the pre-defined period of time is one of every one minute, every five minutes, every ten minutes, every fifteen minutes, every thirty minutes, or every hour.

16. The method of claim 14, wherein the corresponding pre-defined error threshold during the pre-defined period of time is one of one error for one minute, one error for every five minutes, two errors for every ten minutes, three errors for every fifteen minutes, six errors for every thirty minutes, or twelve errors for every hour.

17. The method of claim 14, further comprising sending an alert in response to the determination that the count of errors has exceeded the corresponding pre-defined error threshold.

18. The method of claim 14, further comprising sending an alert in response to a determination that the count of errors has increased or accelerated after two consecutive pre-defined time periods even when the count of errors experienced by the disk drive during the two consecutive pre-defined time periods does not exceed the corresponding predefined error threshold.

19. The method of claim 14, further comprising sending an alert to an engineer associated with the disk drive.

* * * * *